United States Patent [19]

Steidl et al.

[11] Patent Number: 4,684,338
[45] Date of Patent: Aug. 4, 1987

[54] ROD GLAND AND HUB ASSEMBLY FOR TIRE CURING PRESS

[75] Inventors: Larry E. Steidl, Akron; Christopher D. Stemm, Wadsworth, both of Ohio

[73] Assignee: The Goodyear Tire & Rubber Company, Akron, Ohio

[21] Appl. No.: 881,688

[22] Filed: Jul. 3, 1986

[51] Int. Cl.⁴ .............................................. B29C 35/04
[52] U.S. Cl. ...................................... 425/33; 264/315; 425/43; 425/52
[58] Field of Search .......................... 277/12, 32, 112; 264/299, 315, 304, 326; 425/23, 28 R, 31–33, 35, 36, 38, 40, 42–44, 46–48, 50–54, 56, 58, DIG. 47

[56] References Cited

U.S. PATENT DOCUMENTS

| Re. 31,273 | 6/1983 | Peterson | 425/51 |
|---|---|---|---|
| 2,812,546 | 11/1957 | Soderquist | 425/32 |
| 3,171,162 | 3/1965 | Soderquist | 425/36 |
| 3,443,280 | 5/1969 | Hugger | 425/36 |
| 3,659,975 | 5/1972 | Leblond | 425/17 |
| 4,124,337 | 11/1978 | Martin | 425/28 |
| 4,490,325 | 12/1984 | Mattson et al. | 264/315 |
| 4,497,494 | 2/1985 | Allen et al. | 277/27 |
| 4,527,946 | 7/1985 | Singh et al. | 425/42 |

FOREIGN PATENT DOCUMENTS 1388055  3/1975  United Kingdom .

Primary Examiner—Jay H. Woo
Assistant Examiner—J. Fortenberry
Attorney, Agent, or Firm—Frederick K. Lacher; T. P. Lewandowski

[57] ABSTRACT

A rod gland (28) has axially extending inlet and outlet grooves (64,66) at circumferentially spaced positions on a cylindrical outer surface (34) and is provided with an annular seal (60) for preventing leaks between the grooves (64,66). The annular seal (60) is positioned in a groove (59) between an adapter hub (36) and a lower clamping ring hub (38) surrounding and in sliding engagement with the cylindrical outer surface (34) of the rod gland (28) so that at the inlet and outlet grooves (64,66) the sealing is on three sides of the annular seal (60) and between the grooves (64,66) the sealing is on four sides of the annular seal (60).

7 Claims, 4 Drawing Figures

ROD GLAND AND HUB ASSEMBLY FOR TIRE CURING PRESS

This invention relates generally to tire curing presses of the type in which a central rod extends into a tire cavity through a rod gland. An inlet groove in the surface of the rod gland conveys a vulcanizing medium at high temperatures and high pressures into the tire cavity. An outlet groove in the outer surface of the rod gland conveys the cooled vulcanizing medium from the tire cavity to an exhaust system. A surrounding center mechanism including a clamping ring hub and an adapter hub covers the grooves and the outer surface of the rod gland. Because of the high temperatures, bronze metal-to-metal contact seals have been provided between the rod gland and the center mechanism surfaces; however, this design has required close dimensional tolerances and careful installation. It has been found that with the design used heretofore the forces used for installation have distorted the sealing surfaces resulting in leakage between the inlet grooves and outlet grooves. In some cases, this has resulted in temperature stratification during curing which has affected the quality of the tires. With the rod gland and hub assembly of this invention, a replaceable, commercially available composite seal is provided in an assembly which can be installed without subjecting the sealing surfaces to damage. The seal also provides a larger sealing area due to the movement of the sealing material into engagement with the surrounding surfaces upon compression.

In accordance with an aspect of the invention there is provided a center rod gland and hub assembly for a tire curing press comprising:

(a) a generally cylindrical rod gland having a central cylindrical opening for a control rod of the press and a radially outer cylindrical surface;

(b) a lower clamping ring member having a central opening for the rod gland with a radially inner cylindrical surface having substantially the same radius as the radius of the outer cylindrical surface of the rod gland;

(c) a lower clamping ring hub having a central opening for the rod gland positioned with an upper edge axially spaced from a lower edge of the lower clamping ring on member the rod gland and having a radially inner cylindrical surface of substantially the same radius as the radius of the outer cylindrical surface of the rod gland providing an annular space between the upper edge and the lower edge (d) an axially extending inlet groove and an axially extending outlet groove at circumferentially spaced positions in the radially outer surface of the rod gland;

(e) the inlet groove and the outlet groove being in communication with a tire cavity for injecting a curing medium in a heated condition under pressure into the tire cavity and draining the curing medium in the cooled condition from the tire cavity;

(f) an annular seal disposed in the space between the lower edge of the lower clamping ring member and the upper edge of the lower clamping ring hub in sealing engagement with the radially outer surface of the rod gland;

(g) means for urging the lower edge of the lower clamping ring member and the upper edge of the lower clamping ring hub together for compressing the annular seal between the edges whereby the inlet groove is sealed from the outlet groove to prevent temperature stratification of the curing medium during curing of a tire in the tire curing press.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and, as will become apparent to those skilled in these arts, can be modified in numerous ways within the scope of the invention as defined in the claims hereof.

Figure 1:
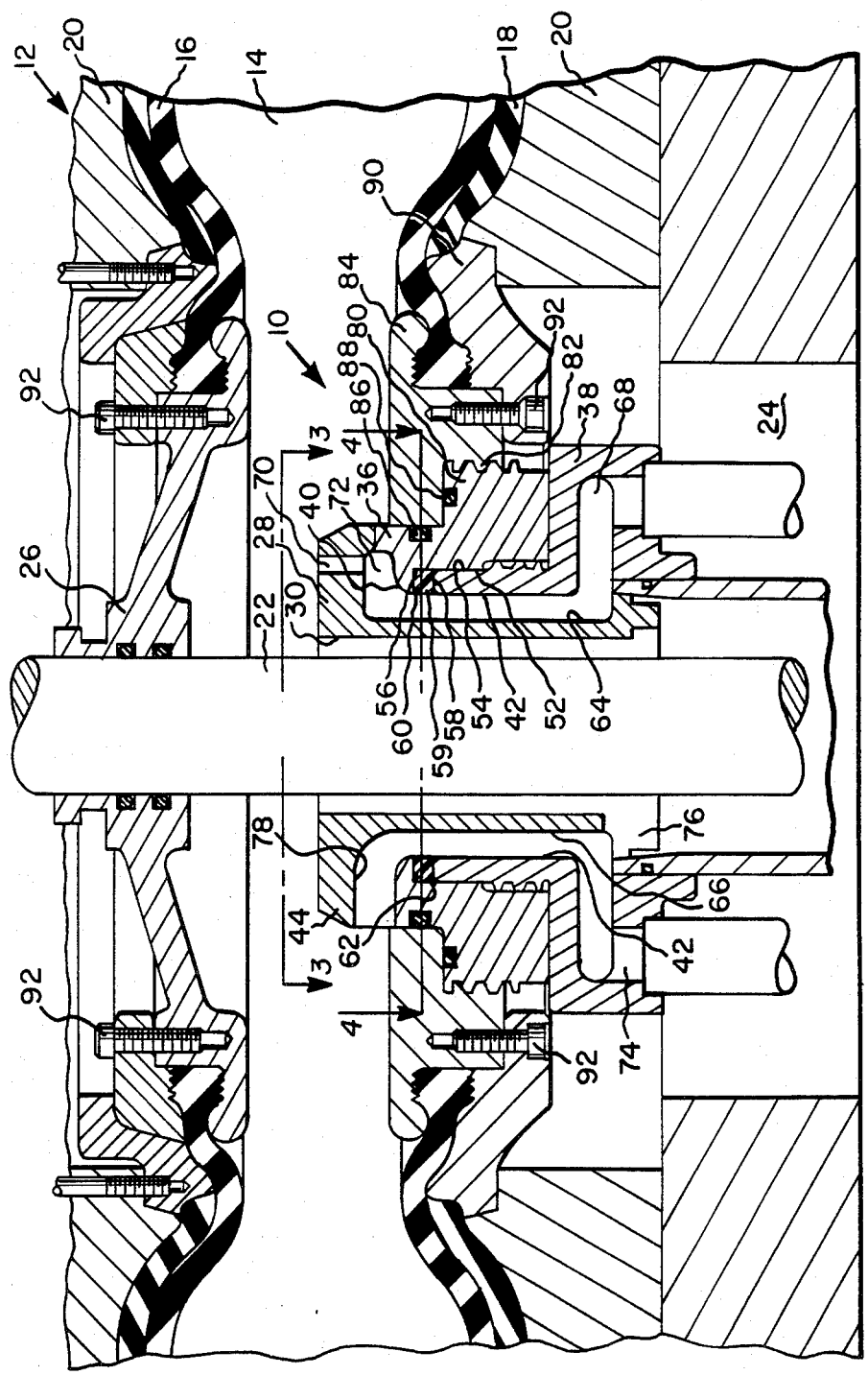
FIG. 1 is a fragmentary cross section of a center mechanism for a tire curing press embodying the invention showing the press closed and in position for curing a tire.

Referring to FIG. 1 a center rod gland and hub assembly 10 is shown mounted in a tire curing press 12 shown in the closed condition with a tire cavity 14 filled with a curing medium for pressing a bladder 16 against a tire casing 18 held in a tire mold 20. At the center of the press 12, a control rod 22 extends from a well 24 in the lower half of the press 12 through the center rod gland and hub assembly 10 into the mold cavity 14 and into sealing engagement with an upper clamping ring 26.

The center rod gland and hub assembly 10 includes a rod gland member 28 which is generally cylindrical and has a central cylindrical opening 30 through which the control rod 22 is movable.

Figure 2:
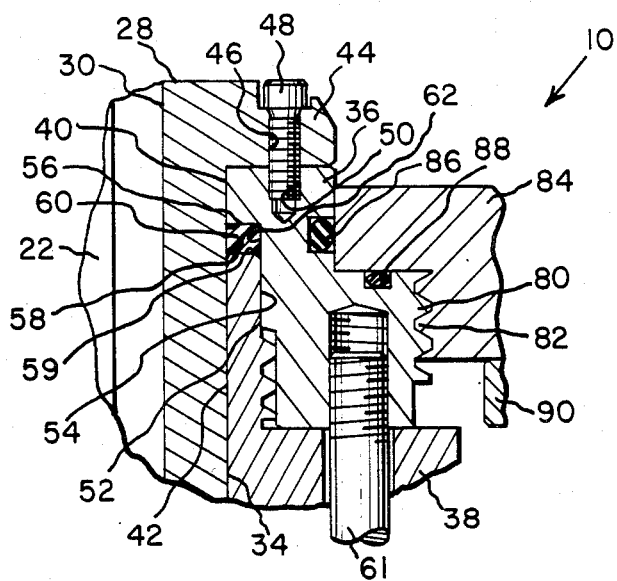
FIG. 2 is a fragmentary sectional view of the center mechanism taken along the line 2—2 in FIG. 3 at a position spaced from the inlet and outlet grooves in the rod gland.
Figure 3:
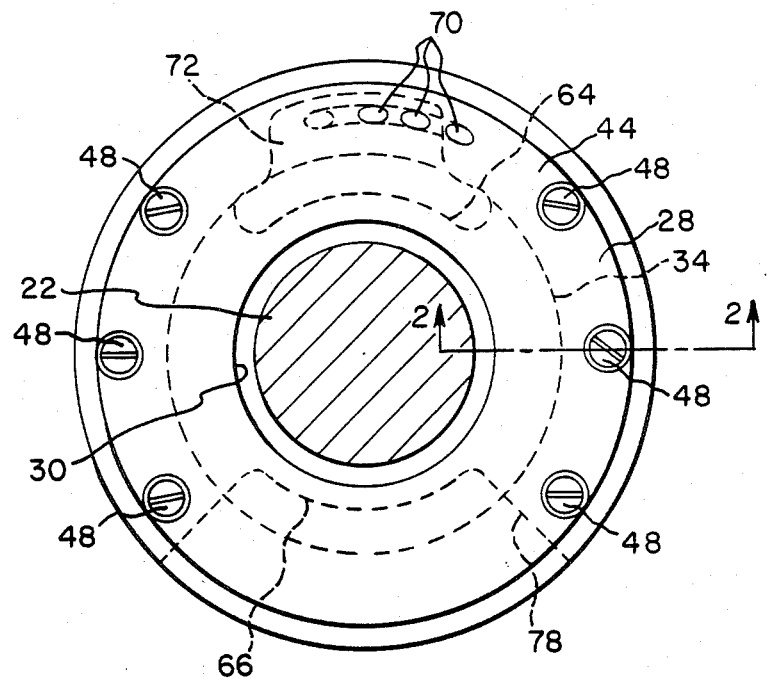
FIG. 3 is a plan view of the rod gland taken along the line 3—3 in FIG. 1 showing the inlet and outlet grooves in dotted lines.

The rod gland member 28 is generally cylindrical and has a generally radially outer cylindrical surface 34, shown in dot-dash lines in FIG. 3. As shown in FIGS. 1 and 2, a lower clamping ring member such as an annular adapter hub 36 and an annular lower clamping ring hub 38 are slidably mounted around the rod gland member 28. The adapter hub 36 has a radially inner cylindrical surface 40 and the lower clamping ring hub 38 has a radially inner cylindrical surface 42 which have substantially the same radii as the radius of the radially outer cylindrical surface 34 of the rod gland member 28. As shown in FIG. 2, the rod gland member 28 has a flange 44 at the upper end in overlapping relationship with the adapter hub 36. Openings 46 in the flange 44 are provided for screws 48 extending through the openings into threaded holes 50 in the adapter hub 36 for clamping the rod gland member 28 to the adapter hub.

The adapter hub 36 has a radially inner surface 52 for sliding engagement with a radially outer surface 54 of the lower clamping ring hub 38. A lower edge 56 of the adapter hub 36 at the adapter hub radially inner surface 40 is spaced from an upper edge 58 of the lower clamping ring hub 38 at the clamping ring radially inner surface 42 providing a space 59 for an annular seal 60. In the embodiment shown the annular seal 60 is of a composite bronze-filled Teflon material having a rectangular cross section to fill the space 59 between the lower edge 56, upper edge 58, radially outer cylindrical surface 34 of the rod gland member 28 and a radially inner mating surface 62 of the lower clamping ring hub 38 as shown in FIG. 2. Circumferentially spaced screws 61 extend through the flange of the lower clamping ring hub 38 into threaded engagement with threaded holes in the adapter hub 36 for compressing the annular seal 60. Preferably the annular seal 60 is compressed about 4 percent. It is understood that other gasket materials and shapes may be used for the annular seal 60 such as an O-ring having a circular cross section in the molded shape.

Figure 4:
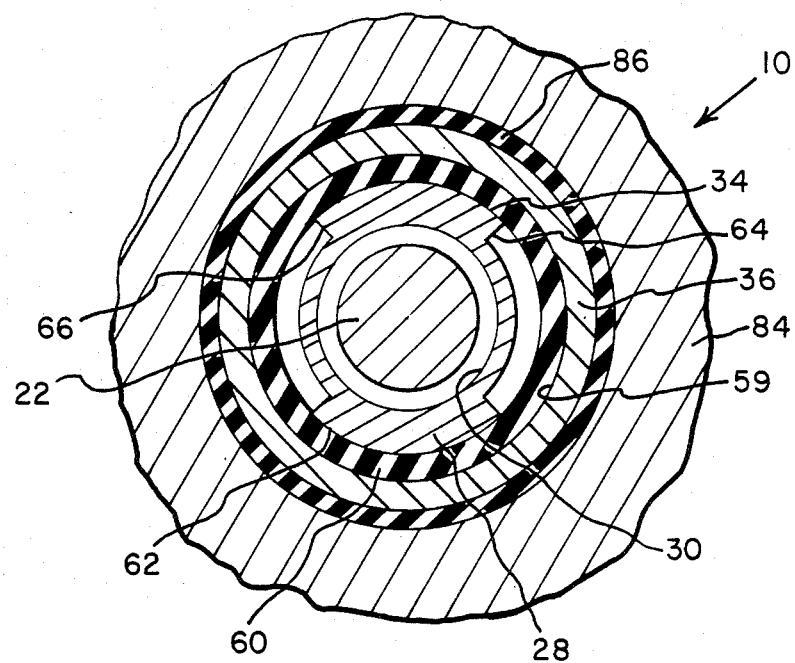
FIG. 4 is a sectional view taken along the line 4—4 in FIG. 1 with parts being broken away.

As shown in FIGS. 1, 3 and 4, the rod gland member 28 has an axially extending inlet groove 64 and an axially extending outlet groove 66 at circumferentially spaced positions in the radially outer cylindrical surface 34 of the rod gland member. The inlet groove 64 is in communication with an inlet passage 68 in the lower clamping ring hub 38 at the lower end and in communication with jet openings 70 in the flange 44 of the rod gland member 28 extending from an inlet chamber 72 in the flange to the tire cavity 14. These jet openings 70 may be inclined at an angle to the vertical to provide swirling action of the curing medium in the tire cavity 14. The curing medium may be a mixture of steam and inert gas (6% nitrogen and 13% $CO_2$) at a temperature of 400° F. and a pressure of 300 psi (21.09 kg/cm$^2$).

The outlet groove 66 may be in communication with an outlet passage 74 in the clamping ring hub 38 and a drain 76 at the lower end and also in communication with a drain opening 78 in the flange 44 of the rod gland member 28. As shown in FIG. 1, a radially inner surface of the annular seal 60 is exposed to the inlet groove 64 and outlet groove 66; however, the surface abutting the lower edge 56 of the adapter hub 36 and the upper edge 58 of the lower clamping ring hub 38 and the surface abutting the radially inner mating surface 62 of the adapter hub are always in sealing engagement. It is, therefore, evident that there is a circumferentially continuous seal provided by the annular seal 60 for sealing engagement on three sides at the inlet groove 64 and the outlet groove 66 and on four sides between the grooves as shown in FIG. 2.

As shown in FIGS. 1 and 2, the adapter hub 36 has screw threads 80 at the radially outer surface for threaded engagement with screw threads 82 of a lower clamping ring 84. O-ring seals 86 and 88 may be provided between the abutting surfaces of the lower clamping ring 84 and the adapter hub 36. A bead ring 90 may be fastened to the lower clamping ring 84 by screws 92 and be seated in the tire mold 20.

It can be seen that with the construction of the center rod gland and hub assembly 10 of this invention, the annular seal 60 may be easily replaced by opening the press 12 and removing the upper clamping ring 26 from the control rod 22. Then the bladder 16 and the lower clamping ring 84 and bead ring 90 may be turned relative to the adapter hub 36 for removal from the press 12 as an assembly. The screws 61 in the adapter hub 36 may then be turned to release the pressure on the annular seal 60 so that the assembly of the rod gland member 28 and adapter hub may be pulled out of the lower clamping ring hub 38 providing access to the annular seal which can then be replaced with a new seal. The center rod gland member and hub assembly 10 may then be reassembled by reversing the order of the steps of disassembly set forth above.

While a certain representative embodiment and details have been shown for the purpose of illustrating the invention, it will be apparent to those skilled in the art that various changes and modifications may be made therein without departing from the spirit or scope of the invention.

What is claimed is:

1. A center rod gland and hub assembly for a tire curing press comprising:
 (a) a generally cylindrical rod gland having a central cylindrical opening for a control rod of said press and a radially outer cylindrical surface;
 (b) a lower clamping ring member having a central opening for said rod gland with a radially inner cylindrical surface having substantially the same radius as the radius of said outer cylindrical surface of said rod gland;
 (c) a lower clamping ring hub having a central opening for said rod gland positioned with an upper edge axially spaced from a lower edge of said lower clamping ring member on said rod gland and having a radially inner cylindrical surface of substantially the same radius as the radius of said outer cylindrical surface of said rod gland providing an annular space between said upper edge and said lower edge;
 (d) said rod gland having an axially extending inlet groove and an axially extending outlet groove at circumferentially spaced positions in said radially outer surface of said rod gland;
 (e) said inlet groove and said outlet groove being in communication with a tire cavity for injecting a curing medium in a heated condition under pressure into said tire cavity and draining said curing medium in the cooled condition from said tire cavity;
 (f) an annular seal disposed in said space between said lower edge of said lower clamping ring member and said upper edge of said lower clamping ring hub in sealing engagement with said radially outer surface said rod gland wherein said annular seal communicates with said inlet groove and said outlet groove;
 (g) means for urging said lower edge of said lower clamping ring member and said upper edge of said lower clamping ring hub together for closing the space between the edges whereby said inlet groove is sealed from said outlet groove to prevent temperature stratification of the curing medium during curing of a tire in said tire curing press.

2. A center rod gland and hub assembly according to claim 1 wherein said rod gland has a flange at an upper end for attachment to said lower clamping ring member and openings in said flange in communication with said inlet and outlet grooves to communicate curing medium to and from said tire cavity.

3. A center rod gland and hub assembly according to claim 1 wherein said means for urging said upper edge of said lower clamping ring hub and lower edge of said adapter hub together includes screw members extending through said lower clamping ring hub into threaded engagement with holes in said lower clamping ring member.

4. A center rod gland and hub assembly according to claim 1 wherein said annular seal is of a resilient material and has a cross section in the compressed condition substantially the same as the cross section of said space between said upper edge and said lower edge for sealing engagement on three sides at said inlet and outlet grooves and on four sides at positions in between said grooves.

5. A center rod gland and hub assembly according to claim 2 wherein said openings in communication with said inlet groove are in an upper portion of said flange and positioned to project the curing medium away from said flange in an axial direction at an inclination to the vertical direction to circulate the curing medium in the tire cavity and said openings in communication with said outlet groove being at the lower end of said tire cavity to drain the curing medium from said tire cavity.

6. A center rod gland and hub assembly in accordance with claim 5 wherein said lower clamping ring hub has an outer cylindrical surface, a lower clamping ring having an inner cylindrical surface with substantially the same diameter as the diameter of said outer cylindrical surface of said lower clamping ring hub, said lower clamping ring having a radially inner flange in overlapping relationship with an upper surface of said lower clamping ring hub and said inner cylindrical surface of said lower clamping ring and said outer cylindrical surface of said lower clamping ring hub being in threaded engagement for pressing said flange against said upper surface of said lower clamping ring member upon relative rotation of said clamping ring relative to said lower clamping ring member.

7. A center rod gland and hub assembly in accordance with claim 6 wherein said annular seal is compressed at least four percent by volume in the compressed condition, said annular seal having a cross section substantially the same as the cross section of said space between said upper edge of said lower clamping ring hub and said lower edge of said lower clamping ring member for sealing engagement on three sides at said inlet and outlet grooves and on four sides at positions in between said grooves.

* * * * *